Oct. 12, 1954   J. DE GIER   2,691,774
VIEWING DEVICE FOR CATHODE-RAY TUBE SCREENS
Filed Nov. 2, 1950
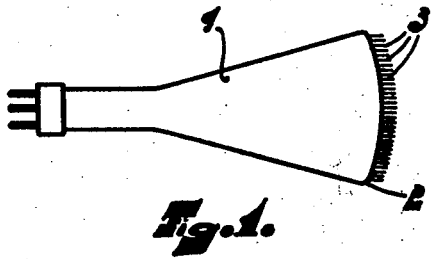
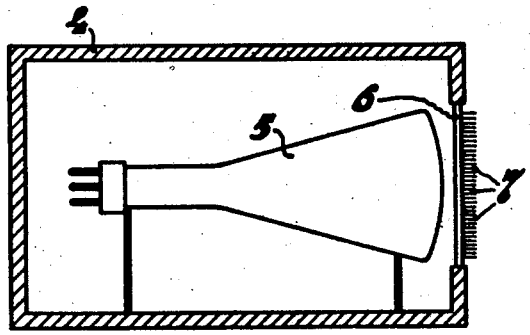
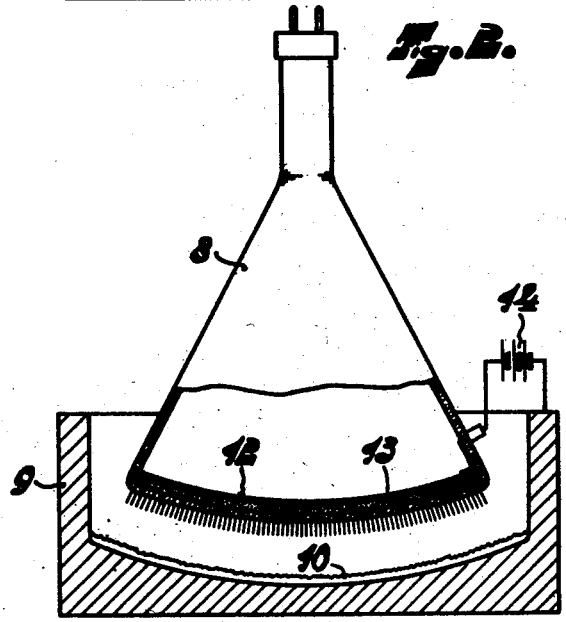
INVENTOR.
JOHANNES DE GIER
AGENT Patented Oct. 12, 1954

2,691,774

UNITED STATES PATENT OFFICE 2,691,774

VIEWING DEVICE FOR CATHODE-RAY TUBE SCREENS

Johannes de Gier, Eindhoven, Netherlands, assignor to Hartford National Bank and Trust Company, Hartford, Conn., as trustee Application November 2, 1950, Serial No. 193,625

Claims priority, application Netherlands December 17, 1949

8 Claims. (Cl. 340—369)

The invention relates to devices comprising a cathode-ray tube for recording images and to cathode-ray tubes for use in such devices.

Devices of the said kind have a limitation in that the contrast between the light and dark parts of the image on the screen is impaired by light incident from without. Particularly with devices of the kind comprising a cathode-ray tube in which the image is produced by luminescence of white-coloured material, the said limitation is particularly prevalent, since the light is reflected at the surface of the luminescent material and is thus radiated again in the direction of the observer's eye. However, such reflection may also occur with other screens, for example incandescent screens, and the invention to be described hereinafter, the object of which is to improve the contrast, is therefore not restricted to devices of the kind comprising a cathode-ray tube having luminescent material but may be generally applied to devices comprising a cathode-ray tube, in which an electron beam produces an image on a screen. It should be noted here that the reflection involved is still increased, if, as is the present-day practice a reflecting metal layer is arranged on the cathode side of the screen.

A further troublesome phenomenon when viewing the image of a cathode-ray tube is due to reflections at the outer surface of the image window, the term "image window" being understood to mean that part of the cathode-ray tube through which the image is observed. It is usually made of glass, but other materials, such as synthetic resins, may be used. The reflection here involved is troublesome because it is directional, that is to say the observer looks, as it were, in a mirror in which he consequently observes objects which are in the viewing room and which appear to be superimposed on the image on the screen of the cathode-ray tube. Particularly if there are light sources, for example lamps or illuminated windows in the viewing room, this reflection is a great nuisance.

As a matter of course, the two kinds of reflection described above do not give rise to trouble, if the viewing room is completely obscured. However, particularly if television devices are concerned, this is greatly inconvenient.

The object of the invention is to reduce the influence which light incident from the outside of the tube has on the contrast of the image. This is achieved by reducing the space angle from which light beams can strike the image window.

A similar problem arises with exposure meters for photographic purposes. In this case, the problem is not to reduce the reflection, but to restrict the solid angle from which light rays can fall on the photo-electric cell in the exposure meter. This object is achieved by arranging a grating, for example in the form of a honeycomb, in front of the photo-electric cell. Incident light rays, except within a limited solid angle are thus prevented in a simple manner from striking the photo-electric cell. In order to render oblique rays definitely harmless, the grating is generally blackened.

It has been suggested before that in front of a cathode-ray tube having a luminescent screen for recording images, there should be arranged a block of transparent material, for example, of synthetic resin, in which a light-absorbing substance is dispersed in order to improve the contrast of the image, since light rays incident from the outside and reflected at the image window or at the luminescent layer pass twice through the absorption layer, whereas light radiated by the image passes through this layer only once. In a particular form of this absorption layer a certain directional effect is provided for by orientating the light-absorbing particles dispersed in the absorption layer in a direction approximately parallel to the axis of the tube. The use of the absorption layer described has the effect of reducing the reflection at the surface of the luminescent screen. However, since the outer surface of the absorption layer is smooth, the second drawback described above, that is to say the reflection at the outside of the image window or in this case the outer surface of the absorption layer, is present.

In a device according to the invention, comprising a cathode-ray tube for recording images, between the image window and the observer are arranged a number of bodies side by side and spaced apart the shape and size of which are such that the solid angle from which light rays can strike the image window from without is reduced and, in addition, the bodies are separated only by air, at least on the side remote from the cathode-ray tube.

As a matter of course, the bodies arranged between the image window and the observer entail some loss of light of the light radiated by the image. However, if the total surface area covered by these bodies (measured in a section approximately parallel to the image window) is not excessive, a material improvement in the total impression of the image may be obtained. The said loss of light will be chosen in accordance with the desire of the observer. It may be important that the contrast should be very great, but in other cases a higher intensity of light is desirable. The ratio between the length of the bodies, measured parallel to the axis of the cathode-ray tube, and the distance by which the bodies are spaced apart determines, as a matter of course, the angle from which light rays can strike the image window. This angle will be chosen, inter alia in accordance with the number of observers to whom the image has to be shown at the same time. A suitable value is, for example, 60° relative to the axis of the cathode-ray tube.

The effect of the bodies may be further improved by rendering at least part of the surface of these bodies light-absorbing, for example by blackening. Moreover, the surface may be frosted. A further improvement may be obtained by partly filling the space between the bodies with light-absorbing material, for example, synthetic resin, in which a light-absorbing substance is dispersed. However, when taking this measure, it is absolutely necessary to take care that the bodies are separated by air only on the side remote from the cathode-ray tube. The extent to which these spaces should be filled (measured from the image window) depends on the desires of the observers, since this degree of filling also determines the space angle from which light rays from the outside can strike the surface of the filler which is capable of reflecting.

The bodies may be shaped in widely different forms. Thus, for example, use may be made of a number of strips, which are arranged on edge relative to the surface of the image window of the cathode-ray tube. If desired, use may be made of a number of intersecting strips, so that a grating or honeycomb is formed.

According to one embodiment, use may be made of thin wires, which extend substantially parallel to the axis of the cathode-ray tube. The material of these wires is not very important. Thus, for example, use may be made of waste threads of different composition out of textile industry. Such waste threads, for example, of artificial silk are commercially obtainable in large quantities at very low cost and of practically any desired size. These threads are rendered light-absorbing in a very simple manner by dyeing. Moreover, treating their surface so as to render it matte, is well-known in the textile industry.

As an alternative, use may be quite satisfactorily made of thin mica scales. This material is also obtainable at low cost as a waste product and may be given the correct size and rendered light-absorbing by simple operations.

It would seem that the application of such material in a manner such that it is directional is a troublesome problem. However, it may be solved in a very simple manner by utilizing a high-voltage field. Such methods of directing particles are known in technique.

Particularly in the use of thin threads, it is to be feared that they might become superposed and thus cover the entire image window, if they are flexible. In cathode-ray tubes, in which the screen is applied to the inner surface of the image window this window is charged statically. If the threads are attached to the outside of the image window, they also will become charged and thus repel one another, so that they will be arranged substantially parallel to the axis of the tube. If desired, the conductivity of the bodies, for example the threads, may be improved by applying a conducting coating, for example of metal. However, in many cases, this is not necessary, since, due to the moisture of the air, the conductivity is generally sufficient. Obviously, the drawback indicated above does not occur unless the bodies have such a length parallel to the axis of the tube that they are mechanically not sufficiently strong, so that they are liable to bend round. (In the case of very short particles, this risk does not prevail.)

The bodies may be supported either by the cathode-ray tube itself or by another part of the device, for example the cabinet, in which the cathode-ray tube is arranged.

In one embodiment of the present invention, the image window has arranged in front of it a transparent plate, for example, of glass, to which the bodies are attached. This plate may also serve to protect the observer in the event of implosion of the tube. If this anti-implosion plate is arranged at some distance from the image window, it is necessary to seal the space between this plate and the cathode-ray tube in a light-excluding manner.

In order that the invention may be readily carried into effect, a number of examples will now be described in detail with reference to the accompanying drawings, in which:

Fig. 1 shows a cathode-ray tube, the image window of which is covered on the outer surface with thin threads;

Fig. 2 shows part of an apparatus comprising a cathode-ray tube, in front of which is arranged an anti-implosion window which is covered with mica scales, and Fig. 3 shows diagrammatically part of an apparatus for covering the image window of a cathode-ray tube with threads or scales, for example, of textile, mica, glass.

Referring to Fig. 1, the reference number 1 designates a cathode-ray tube of conventional construction. The image window is provided on the outer surface with a great number of thin threads 3.

Referring to Fig. 2, the reference number 4 designates the cabinet of an apparatus comprising a cathode-ray tube 5 of conventional construction. In the cabinet wall is secured an anti-implosion window 6, on which are provided thin mica scales 7.

Referring to Fig. 3, the reference number 8 designates a television tube of conventional construction; 9 designates a bowl (shown in sectional view) of conducting material, for example of metal. This bowl is provided with a layer 10 of thin mica or glass threads. The television tube is internally provided with a reflecting metal layer 12 on the cathode side of the image screen 13. Applied across this metal layer 12 and the bowl 9 is a high direct voltage for example, 25 kv., from a battery 14. This has the effect of charging the particles in the bowl and causing them to move in the direction of the television tube, the electric field ensuring a correct inplanting direction in the agglutinant previously provided on the image window of this tube. By drying the agglutinant, absolutely secure attachment is obtained.

If a cathode-ray tube which is not internally provided with a metal layer is to be coated by the method described above, a suction grating may be arranged in front of the image window and the bowl. If this grating is of suitable size, a great deal of the particles in the bowl will rush through the grating owing to the high voltage and adhere to the tube. As an alternative, the outer surface of the glass may be rendered conducting either permanently, for example by using tin oxide, or temporarily.

The contrast-improving measures according to the invention may be applied to any kind of cathode-ray tubes, for example to television tubes, tubes for oscillographs, cathode-ray indicators, and so forth.

What I claim is:

1. In combination with a cathode-ray tube having a viewing screen, a viewing device comprising a plurality of spaced apart thin elongated wire-like threads in proximity to the viewing screen, each of said threads being arranged lengthwise substantially parallel to the axis of said tube and having dimensions at which the solid angle at which light-rays from without the tube strike the screen is reduced, said threads on the side remote from the screen being separated by air, and the space between the threads being partly filled with a light-absorbing material.

2. A device as claimed in claim 1 in which the threads are electrically conducting.

3. A device as claimed in claim 1 in which the end surfaces of the threads remote from said tube are light-absorbing.

4. A device as claimed in claim 1 in which the threads are supported on end by the cathode-ray tube.

5. In combination with a cathode-ray tube having a viewing screen, a viewing device comprising a plurality of spaced apart thin elongated wire-like threads in proximity to the viewing screen, each of said threads being arranged lengthwise substantially parallel to the axis of said tube and having dimensions at which the solid angle at which light-rays from without the tube strike the screen is materially reduced, said threads being separated by air.

6. A device as claimed in claim 5 in which the threads are constituted by artificial silk.

7. A device as claimed in claim 5, in which the threads are constituted by mica.

8. A device as claimed in claim 5 in which the end surfaces of the threads remote from the viewing screen are light-absorbing.

References Cited in the file of this patent

UNITED STATES PATENTS

| Number | Name | Date |
|---|---|---|
| 2,388,203 | Zindel, Jr. | Oct. 30, 1945 |
| 2,481,621 | Rosenthal | Sept. 13, 1949 |